US005861883A

United States Patent [19]
Cuomo et al.

[11] Patent Number: 5,861,883
[45] Date of Patent: Jan. 19, 1999

[54] METHOD AND SYSTEM FOR PORTABLY ENABLING AWARENESS, TOURING, AND CONFERENCING OVER THE WORLD-WIDE WEB USING PROXIES AND SHARED-STATE SERVERS

[75] Inventors: Gennaro A. Cuomo, Apex; Binh Q. Nguyen; Hung D. Nguyen, both of Cary; Sandeep K. Singhal, Raleigh, all of N.C.

[73] Assignee: International Business Machines Corp., Armonk, N.Y.

[21] Appl. No.: 855,244

[22] Filed: May 13, 1997

[51] Int. Cl.$^6$ ........................................ G06F 15/00
[52] U.S. Cl. .................. 345/326; 345/348; 395/200.31; 395/200.33; 395/200.49; 395/200.69
[58] Field of Search .................................... 345/335, 338, 345/340, 326, 348; 395/200.58, 200.76, 200.31, 200.32, 200.33, 200.36, 200.48, 200.49, 200.55, 200.56, 200.59, 200.62, 200.67, 200.75, 500, 712; 707/1–3, 10, 500, 501, 513, 531

[56] References Cited

U.S. PATENT DOCUMENTS

5,696,898  12/1997  Baker et al. ........................ 395/187.01
5,736,984   4/1998  Jellinek et al. ........................ 345/338

*Primary Examiner*—Huynh Ba
*Attorney, Agent, or Firm*—A. Bruce Clay

[57] ABSTRACT

Collaboration capabilities (both "push" and "pull" of information) are portably added to World-Wide Web content. In particular, a persistent connection is maintained to a shared state server for retrieving data via a "push" mechanism which maintains the freedom to access arbitrary Web content via the "pull" mechanism. Moreover, the collaboration is provided in a portable manner, in the same way that all other Web content is portable both across hardware platforms and across browser implementations.

27 Claims, 7 Drawing Sheets

METHOD AND SYSTEM FOR PORTABLY ENABLING AWARENESS, TOURING, AND CONFERENCING OVER THE WORLD-WIDE WEB USING PROXIES AND SHARED-STATE SERVERS

FIELD OF THE INVENTION

This invention relates in general to computer software, and in particular to a method and system for enabling multi-user collaboration over the World-Wide Web. More particularly, the present invention relates to a method and system by which awareness, touring, and conferencing can be performed in a portable manner.

BACKGROUND OF THE INVENTION

Two techniques are in use today for delivering data from a supplier to a consumer: "push" and "pull". Under a "push" model, which is used by services such as PointCast, Castanet, and TIB, information is sent to the recipient whenever it becomes available at the source. Under a "pull" model, which is used by services such as Excite, the data is only transmitted to the recipient in response to an explicit request. These two methods excel at a variety of data retrieval tasks, from supporting random searches ("pull") to delivering dynamic information updates ("push").

However, these data retrieval metaphors are insufficient to support real-time collaboration among multiple users over the Internet. Such applications include shared whiteboards, text and audio chat, shared slide shows, video, distance learning, and collaborative browsing of Web pages. These applications are characterized by the need to establish user groups and exchange information to ensure that all members of a particular group see consistent information (e.g. see the same whiteboard image, see and hear each others' text/audio, see slides/video in a synchronized manner, see the same Web page, etc). In effect, the consistent shared state updates are "pushed" to each client. At the same time, we need to provide freedom for each user to retrieve information by downloading arbitrary Web pages (a "pull" metaphor) and presenting that information to the collaborative application and group.

Typically, these collaborative systems run as stand-alone applications because of their need to exchange specific data types and their special "push" and "pull" requirements. Indeed, these applications provide their own custom user interface and do not interoperate with existing tools.

Systems like America Online's "Virtual Places" (VP) system have attempted to integrate collaboration into existing World-Wide Web browsers such as Netscape Navigator. When the collaboration requires the user to see a new Web page or slide, this system communicates directly with the Web Browser and instructs it to display the particular Web page. To perform this communication, VP relies on a Dynamic Data Exchange (DDE) interface exported by the particular Web Browser. DDE enables applications to exchange a pre-defined set of events, as supported by the particular endpoint applications.

The use of DDE restricts the VP functionality, however. First, DDE is only available on Microsoft Windows platforms. Furthermore, because the DDE interface is application-specific, the particular interface used by VP only works with the Netscape Navigator browser. In summary, the VP system does not provide a portable mechanism for integrating collaboration with the World-Wide Web.

Therefore, a need exists for a method and system for portably adding collaboration capabilities (both "push" and "pull" of information) to World-Wide Web content. In particular, a persistent connection is to be maintained to a shared state server for retrieving data via a "push" mechanism which maintains the freedom to access arbitrary Web content via the "pull" mechanism. Moreover, the collaboration should be provided in a portable manner, in the same way that all other Web content is portable both across hardware platforms and across browser implementations.

SUMMARY OF THE INVENTION

An object of the present invention is to provide a method for maintaining a persistent link to a shared state system while simultaneously enabling access to arbitrary information outside the collaboration environment.

Another object of the present invention is to enable collaboration applications to interact with existing (non-collaborative) applications without modifying those existing applications.

Yet another object of the present invention is to enable collaboration in a manner that is portable across different hardware, operating systems, and execution environments.

To achieve the foregoing objects and in accordance with the purpose of the invention as broadly described herein, a method and system are disclosed for using proxies and shared state servers to enable collaboration within existing Web browsers. These and other features, aspects, and advantages of the present invention will become better understood with reference to the following description, appended claims, and accompanying drawings.

BRIEF DESCRIPTION OF THE DRAWINGS

For a more complete understanding of the present invention and for further advantages thereof, reference is now made to the following Detailed Description taken in conjunction with the accompanying drawings, in which.

DETAILED DESCRIPTION OF THE INVENTION

Figure 1:
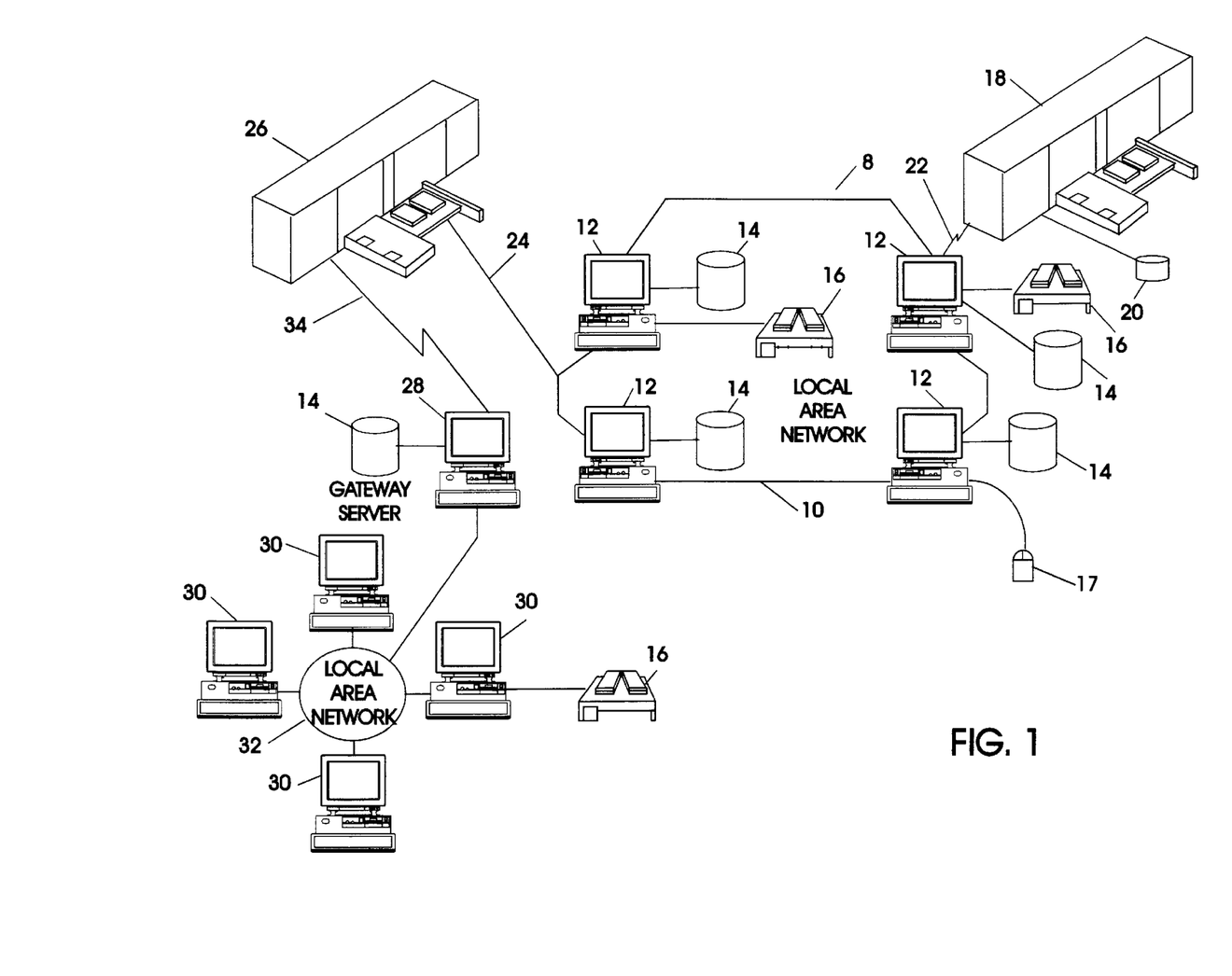
FIG. 1 is a pictorial representation of a data processing system which may be utilized to implement a method and system of the present invention.

Referring to FIG. 1, there is depicted a graphical representation of a data processing system 8, which may be utilized to implement the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network. Each said network may also consist of a plurality of processors coupled via a communications medium, such as shared memory, shared storage, or an interconnection network. As is common in such data processing systems, each individual computer may be coupled to a storage device 14 and/or a printer/output device 16 and may be provided with a pointing device such as a mouse 17.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a sub-system control unit/communications controller 26 and communications link 34 to a gateway server 28. The gateway server 28 is preferably an IWS which serves to link LAN 32 to LAN 10.

With respect to LAN 32 and LAN 10, a plurality of documents or resource objects may be stored within storage device 20 and controlled by mainframe computer 18, as resource manager or library service for the resource objects thus stored. Of course, those skilled in the art will appreciate that mainframe computer 18 may be located a great geographic distance from LAN 10 and similarly, LAN 10 may be located a substantial distance from LAN 32. For example, LAN 32 may be located in California while LAN 10 may be located within North Carolina and mainframe computer 18 may be located in New York.

Software program code which employs the present invention is typically stored in the memory of a storage device 14 of a stand alone workstation or LAN server from which a developer may access the code for distribution purposes, the software program code may be embodied on any of a variety of known media for use with a data processing system such as a diskette or CD-ROM or may be distributed to users from a memory of one computer system over a network of some type to other computer systems for use by users of such other systems. Such techniques and methods for embodying software code on media and/or distributing software code are well-known and will not be further discussed herein.

Figure 2:
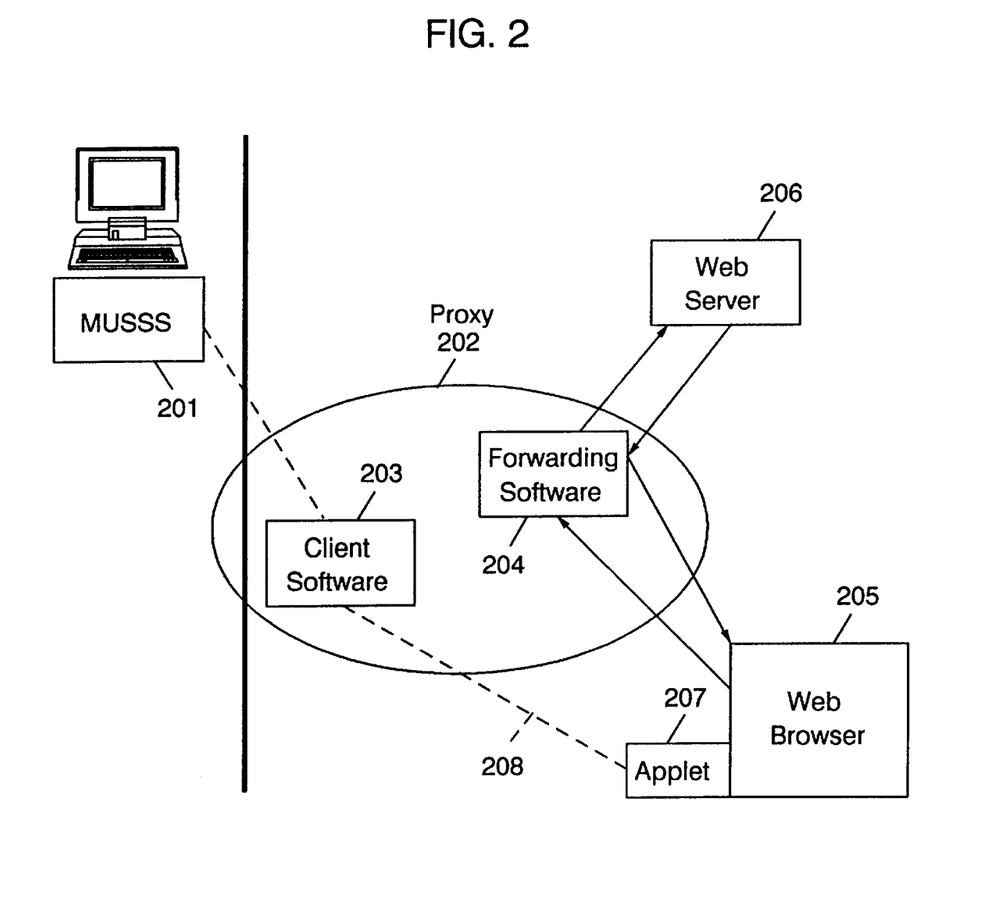
FIG. 2 shows the data processing elements of a collaborative system that integrates with Web Browsers in a platform-independent manner.

Referring to FIG. 2, the basic elements of a collaborative system that integrates with a Web Browser are shown. A Multi-User Shared State Server (MUSSS) 201 provides collaboration services on behalf of a set of users. This server is responsible for facilitating the exchange of information among collaborators. Although not shown, it is to be understood that the MUSSS may comprise a plurality of interconnected servers that together provide the services offered by a MUSSS.

A Proxy 202 runs on each client host. It includes Client Software 203 that communicates with the MUSSS 201. Although the Proxy resides on the client host in the preferred embodiment, alternative embodiments may place the Proxy on other hosts, such as on a well known server. Over this communication, a client provides information to the collaborative session and receives information from other participants in the collaboration. The Proxy 202 also contains Forwarding Software 204 that receives Web page requests from a local Web Browser 205 and forwards them to an appropriate destination Web Server 206. The Forwarding Software 204 manipulates the retrieved data before delivering it to the Web Browser 205.

Finally, the Web Browser 205 displays the retrieved data from the Web Server 206 via Forwarding Software 204. The Browser 205 executes an Applet 207 that is embedded by the Forwarding Software 204 into the retrieved data. Applet 207 maintains a connection 208 to the Client Software 203 in the Proxy 202. Over connection 208, the Applet receives commands from the collaboration session and provides information that the Client Software 203 can disseminate to the collaboration session. Typically, the Applet 207 is written in the Java or JavaScript programming languages, which are standard mechanisms for delivering software to Web Browsers in a browser-independent and platform-independent manner.

Figure 3:
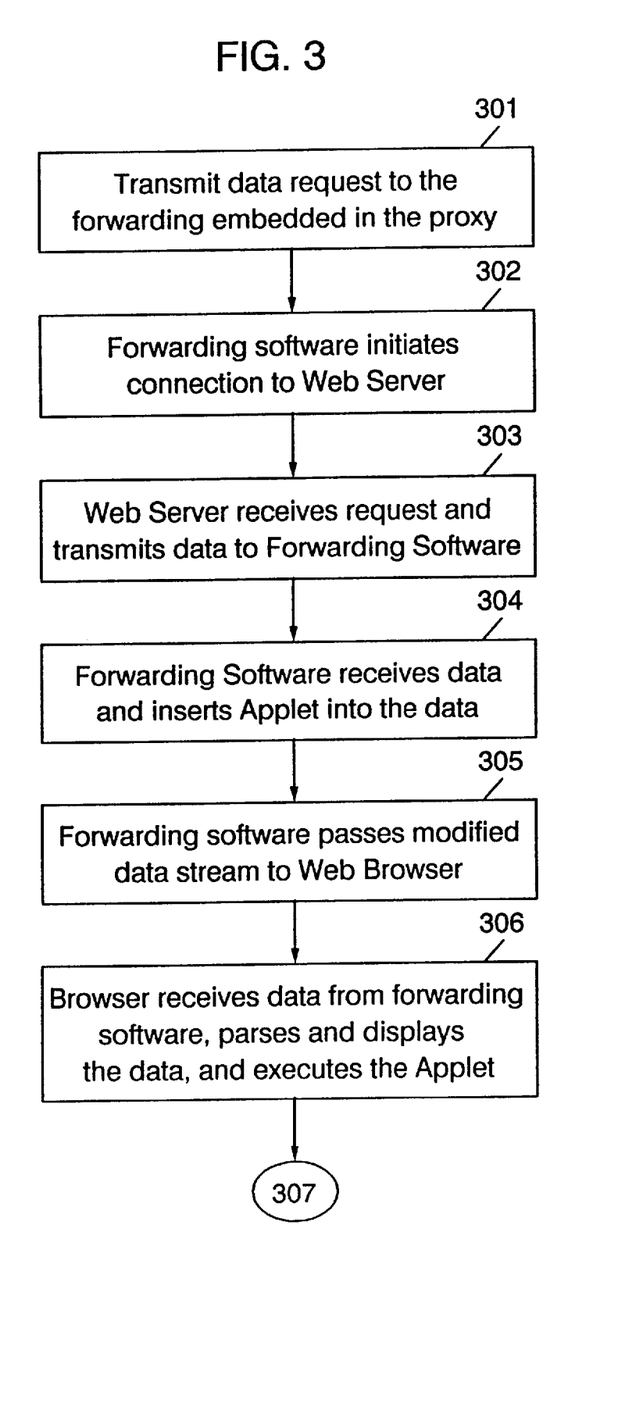
FIG. 3 is a flowchart depicting the steps required for delivering data from a Web Server to a Web Browser in a collaborative environment.

Referring now to FIG. 3, a flowchart depicts how Web data is retrieved by a Web Browser. At block 301, the Web Browser transmits a data request to the Forwarding Software embedded inside the Proxy. At block 302, the Forwarding Software initiates a connection to the appropriate Web Server. At block 303, the Web Server receives the request and transmits data to the Forwarding Software. At block 304, the Forwarding Software receives data from the Web Server and inserts an Applet into the data. At block 305, the Forwarding Software passes the retrieved data (with the inserted Applet) to the Browser. At block 306, the Browser receives the data, parses the data, displays the data, and executes the Applet. The procedure then terminates at 307. Although not shown, it is understood that blocks 303, 304, and 305 may occur concurrently as data is streamed from the Web Server to the Forwarding Software to the Web Browser. Although the Applet is inserted by the Forwarding Software in the preferred embodiment, alternative embodiments may have the Applet inserted by the Web Server or statically present within the page.

The Applet is responsible for initiating a connection to the Client Software (see FIG. 2) so that the Web Browser may be linked with the collaboration even though arbitrary content has been loaded (pulled) into the Browser. When the Applet is inserted into the data retrieved from the Web Server, the Forwarding Software may provide parameter(s) that designate how that Applet should connect to the Client Software. In addition, when the Web page contains "frames" representing multiple documents that are simultaneously visible, multiple Applets may be active simultaneously. Consequently, the first Applet to run places itself into a global variable, so that multiple Applets do not communicate with the Client Software simultaneously from within a single Web Browser.

Once the Applet is executed, it sends an "addURL" message to inform the Client Software of which page is currently visible on the Browser window. When the Applet is termninated, it sends "removeURL" message notifying the Client Software that the page is no longer visible. It may send "readData" and "writeDAta" messages to respectively retrieve and store persistent information from and to the Proxy. Finally, the Applet listens for commands from the Client Software such as, for example, a request to load a new Web page into the Browser.

Figure 4A:
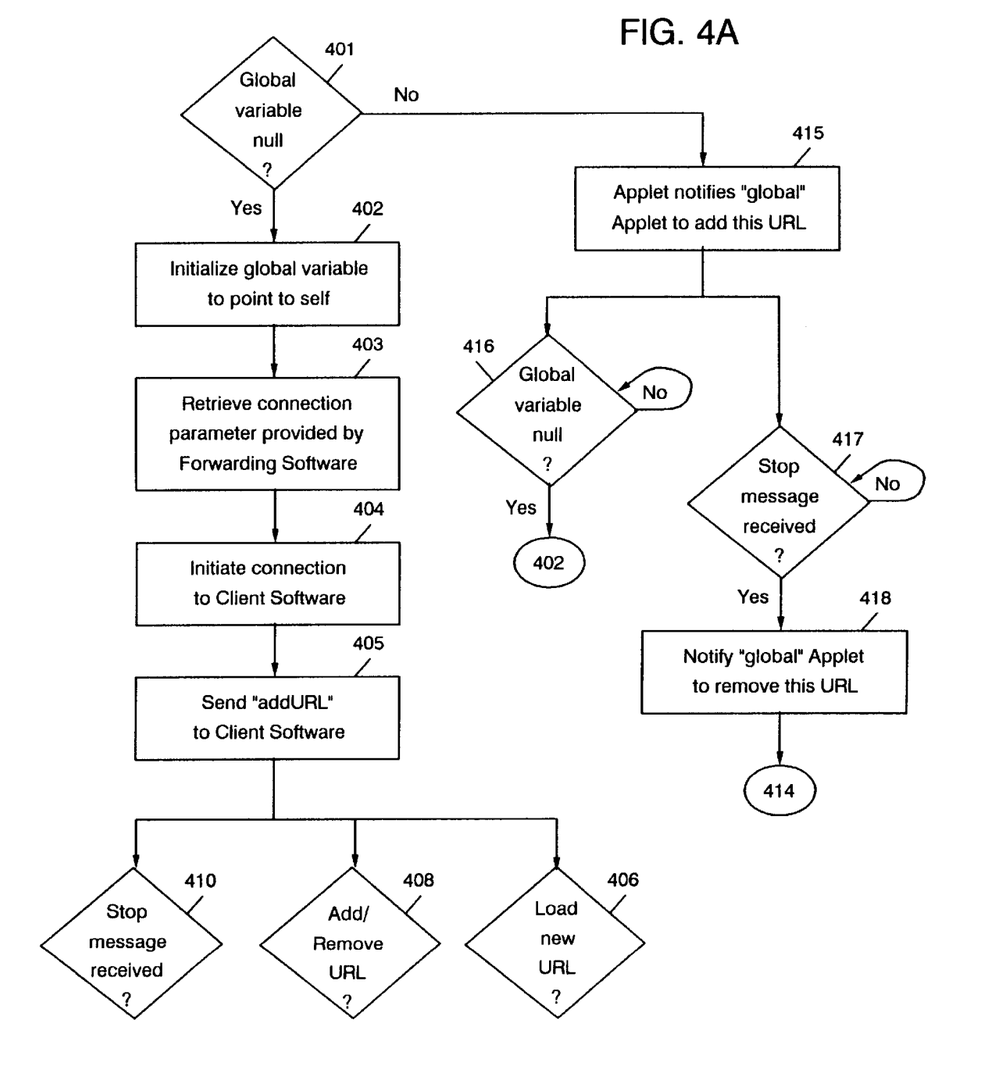
FIGS. 4A, 4B, 4C and 4D are flowcharts illustrating the actions performed by the inserted Applet when it executes in the Web Browser.
Figure 4B:
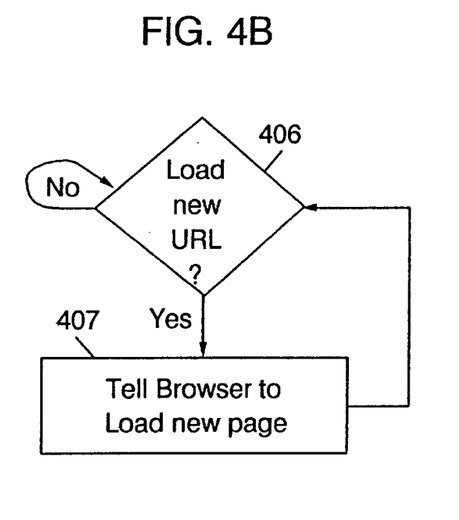
Figure 4C:
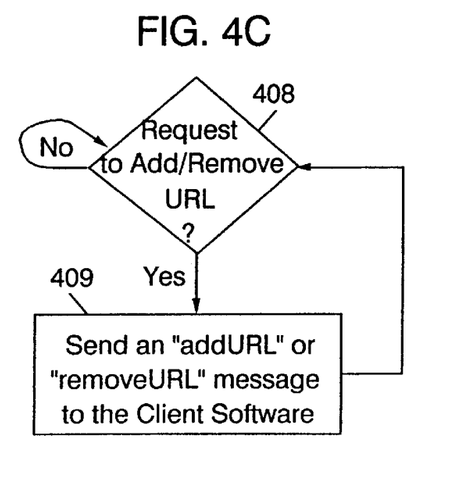
Figure 4D:
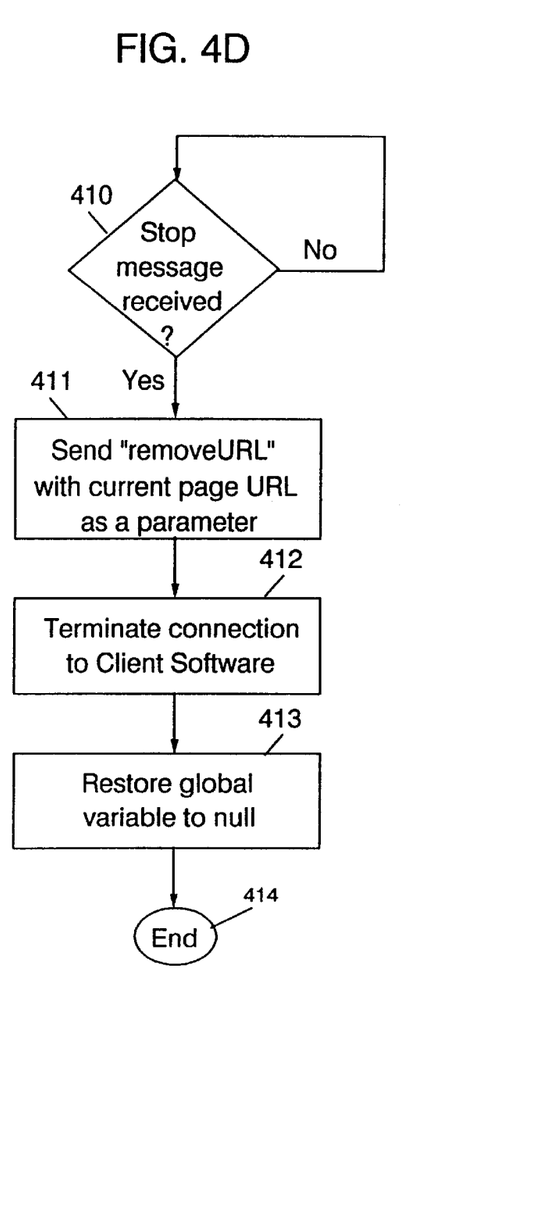

Referring now to FIG. 4A, a flowchart illustrates the actions performed by the Applet inserted by the Forwarding Software when it executes in the Web Browser. At decision block 401, the Applet checks whether or not the global variable is null. If the response to decision block 401 is yes, then in block 402, the Applet initializes the global variable to point to itself. In block 403, the Applet retrieves any connection parameters provided by the Forwarding Software. In block 404, the Applet initiates a connection to the Client Software. At block 405, the Applet sends an "addURL" message with the current page URL as a parameter over its connection to the Client Software. At this point, the Applet initiates three concurrent execution paths through blocks 406, 408, and 410. Referring to FIG. 4B, at decision block 406, the Applet determines whether a command to load a new URL is received from the Client Software. If the response to decision block 406 is yes, then at block 407, the Applet notifies the Browser to load a new page and then returns to decision block 406. Concurrently, at block 408 (FIG. 4C), the Applet determines whether or not it received a request from another Applet to add or remove a URL. If the response to decision block 408 is yes, then at block 409 the Applet sends an "addURL" or "removeURL" message over its connection to the Client Software and then returns to decision block 408. Concurrently, at decision block 410 (FIG. 4D), the Applet determines whether or not a stop message has been received from the Browser. If the response to decision block 410 is no, execution returns to decision block 410. If the response to decision block 410 is yes, then at block 411, the Applet sends a "removeURL" message to the Client Software with the current page URL as a parameter. At block 412, the Applet terminates the connection to the Client Software. At block 413, the Applet restores the global variable to null. It then terminates at block 414.

Continuing with FIG. 4A, if the answer to decision block 401 is no, then at block 415, the Applet notifies the Applet represented by the global variable to add a URL. At this point, the Applet initiates two concurrent execution paths through blocks 416 and 417. At decision block 416, the Applet determines whether or not the global variable is null. If the response to decision block 416 is no, execution returns to block 416. If the response to decision block 416 is yes, execution continues to block 402. Concurrently, at block 417, the Applet determines whether or not a stop message has been received from the Browser. If the response to decision block 417 is no, execution returns to decision block 417. If the response to decision block 417 is yes, then at block 418, the Applet notifies the Applet represented by the global variable to remove this URL. The Applet then terminates at 414.

Within this collaborative system, the users may collaborate with each other according to whether they are currently viewing the same page. When the Client Software receives an "addURL" or "removeURL" notification, it forwards the information to the MUSSS. With information about the pages currently viewed by each user, the MUSSS is responsible for ensuring that collaborative data (including text and audio chat, whiteboard data, etc.) is exchanged among users who are seeing one or more documents in common on their respective Browsers or among groups of users as determined by the application.

Through this collaboration system, users may participate in a "Tour." In such a Tour, when a designated Leader "pulls" a new page into his Browser, the Browsers at one or more "followers" automatically load the same page. In this way, a group of users may concurrently "pull" content from the Web while the collaboration system "pushes" information to ensure that the pages seen by the users are consistent.

Figure 5:
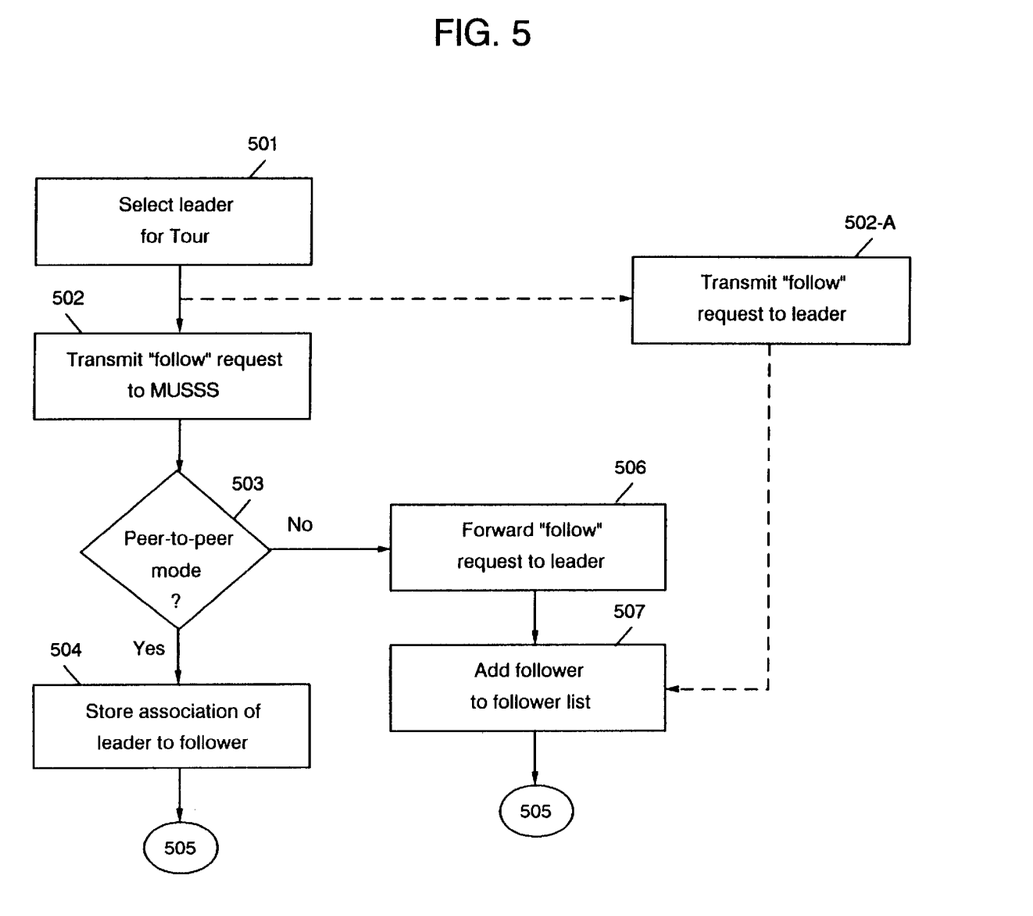
FIG. 5 is a flowchart illustrating how a user joins a Tour.

Referring now to FIG. 5, the mechanism by which a user joins a Tour is illustrated. At block 501, the user selects a leader for the Tour. At block 502, the Client Software transmits a "follow" request including the leader's identity to the MUSSS. At decision block 503, the MUSSS determines whether or not the system is operating in a peer-to-peer mode. If the response to decision block 503 is no, then at block 504, the server stores an association between the leader and the follower. The procedure then terminates at 505. If the response to decision block 503 is yes, then at block 506, the server forwards the "follow" request to the leader who, at block 507, adds the follower to his own follower list. The procedure then terminates at 505.

Although not depicted in FIG. 5, it is to be understood that the path through blocks 502, 503, and 506 may be shortened if the Client Software can determine that the system is operating in a peer-to-peer mode; in this case, the Client Software can transmit the "follow" request directly to the leader, as represented by block 502-A.

Figure 6:
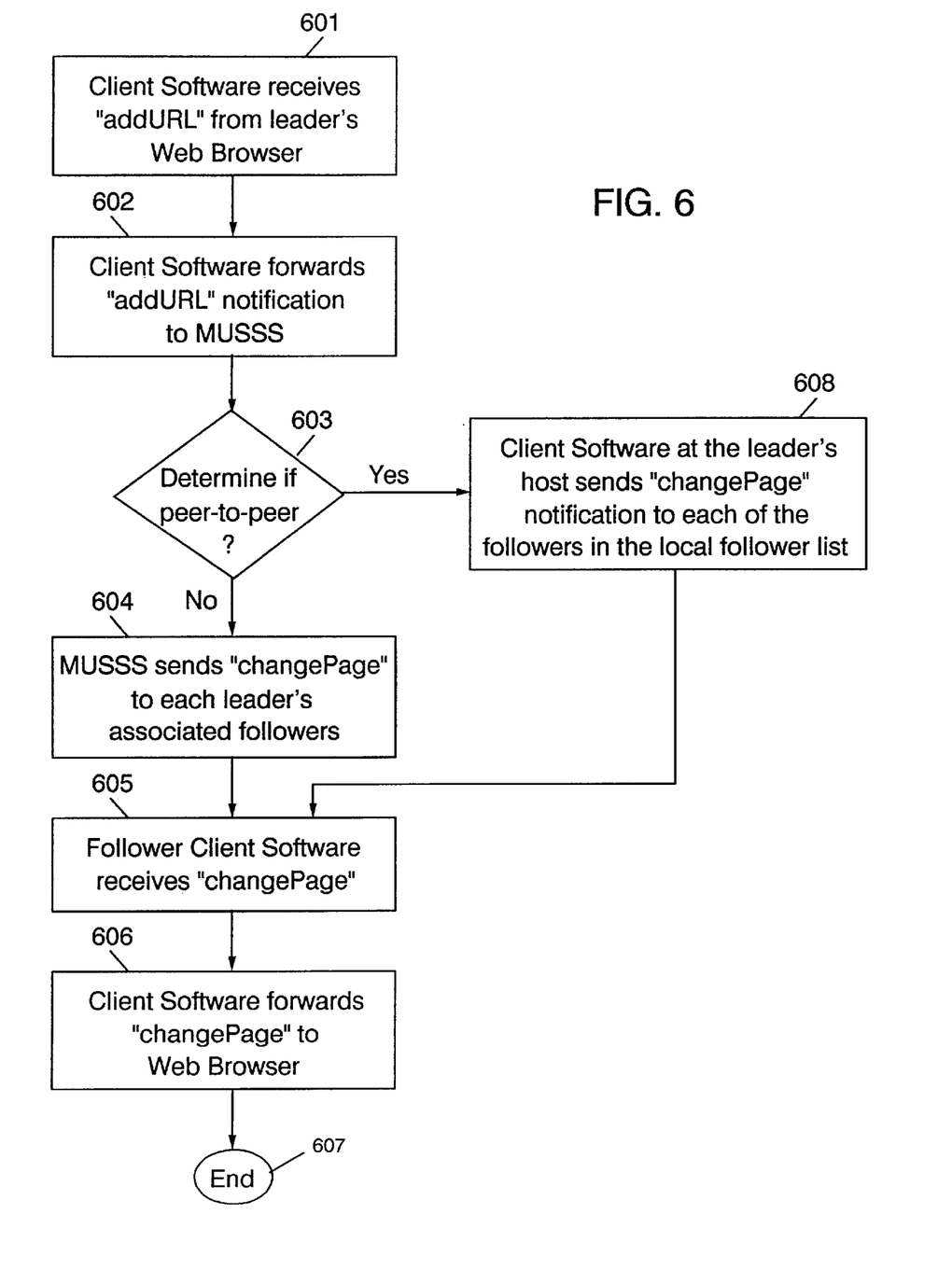
FIG. 6 is a flowchart illustrating how a user is notified when a Tour leader moves to a new Web page.

Referring now to FIG. 6, the mechanism by which followers are notified when a Tour leader moves to a new Web page is shown. In block 601, the Client Software receives an "addURL" message from the leader's Web Browser. At block 602, the Client Software forwards the "addURL" notification to the MUSSS. At decision block 603, it is determined whether or not the system is operating in a peer-to-peer mode. If the response to decision block 603 is no, then at block 604, the MUSSS sends "changePage" notifications to each of the leader's associated followers. At block 605, the Client Software at a follower receives a "changePage" notification from the MUSSS. At block 606, the Client Software forwards the "changePage" notification to the Applet running in the local Web Browser. The process then terminates at block 607. If the response to decision block 603 is yes, then at block 608, the Client Software at the leader's host sends "changePage" notifications to each of the followers in the local follower list. Control then continues to block 605, as described above.

Thus, the collaboration system can push information to all clients while simultaneously allowing them to pull arbitrary information from Web servers. Moreover, because control of the Browser is performed through an Applet written in Java, the collaboration system is independent of the particular machine or operating system environment and is independent of the particular Web Browser in use.

Although the present invention has been described with respect to a specific preferred embodiment thereof various changes and modifications may be suggested to one skilled in the art and it is intended that the present invention encompass such changes and modifications as fall within the scope of the appended claims.

We claim:

1. A method of retrieving data from an information server, comprising the steps of:

a requester initiating a request for data from an information server;

sending said request to a Proxy;

said Proxy forwarding said request to said information server;

said Proxy receiving and storing data from said information server;

inserting an Applet into said data;

delivering said data and said Applet to said requester of said data;

executing said Applet, wherein said step executing said Applet further comprises:

initiating a connection to Client Software, wherein said Client Software communicates with a Multi-User Shared State Server; and terminating said connection to Client Software.

2. The method of claim 1, further comprising the step of:

sending an "addURL" notification over said connection to Client Software.

3. The method of claim 1, further comprising the step of:

sending a "removeURL" notification over said connection to Client Software.

4. The method of claim 1, further comprising the step of:

sending a "readData" request over said connection to Client Software.

5. The method of claim 1, further comprising the step of:
sending a "writeData" request over said connection to Client Software.

6. The method of claim 1, further comprising the steps of:
receiving a "changePage" notification over said connection to Client Software; and
initiating the retrieval of new data in accordance with said "changePage" notification.

7. The method of claim 6, further comprising the steps of:
initiating a "follow" request for a target leader from said Client Software;
recording an identity of an originator of said "follow" request; and
initiating a "changePage" request to said originator as a result of actions taken by said target leader.

8. The method of claim 1, wherein said step of initiating a connection to Client Software includes determining an identity of a "global" Applet, and wherein said connection to said Client Software is a logical connection established by forwarding requests to said "global" Applet.

9. The method of claim 8, further comprising the steps of:
monitoring for a presence of a "global" Applet; and
becoming said "global" Applet should there be no said "global" Applet present.

10. A system for retrieving data from an information server, comprising:
means for a requester initiating a request for data from an information server;
means for sending said request to a Proxy;
means for said Proxy forwarding said request to said information server;
means for said Proxy receiving and storing data from said information server;
means for inserting an Applet into said data;
means for delivering said data and said Applet to said requester of said data;
means for executing said Applet, wherein said means for executing said Applet further comprises:
means for initiating a connection to Client Software, wherein said Client Software communicates with a Multi-User Shared State Server; and
means for terminating said connection to Client Software.

11. The system of claim 10, further comprising:
means for sending an "addURL" notification over said connection to Client Software.

12. The system of claim 10, further comprising:
means for sending a "removeURL" notification over said connection to Client Software.

13. The system of claim 10, further comprising:
means for sending a "readData" request over said connection to Client Software.

14. The system of claim 10, further comprising:
means for sending a "writeData" request over said connection to Client Software.

15. The system of claim 10, further comprising:
means for receiving a "changePage" notification over said connection to Client Software; and
means for initiating the retrieval of new data in accordance with said "changePage" notification.

16. The system of claim 15, further comprising:
means for initiating a "follow" request for a target leader from said Client Software;
means for recording an identity of an originator of said "follow" request; and
means for initiating a "changePage" request to said originator as a result of actions taken by said target leader.

17. The system of claim 10, wherein said means for initiating a connection to Client Software includes means for determining an identity of a "global" Applet, and wherein said connection to said Client Software is a logical connection established by forwarding requests to said "global" Applet.

18. The system of claim 17, further comprising:
means for monitoring for a presence of a "global" Applet; and
means for becoming said "global" Applet should there be no said "global" Applet present.

19. A computer program product recorded on computer readable medium for retrieving data from an information server, comprising:
computer readable means for a requester initiating a request for data from an information server;
computer readable means for sending said request to a Proxy;
computer readable means for said Proxy forwarding said request to said information server;
computer readable means for said Proxy receiving and storing data from said information server;
computer readable means for inserting an Applet into said data;
computer readable means for delivering said data and said Applet to said requester of said data;
computer readable means for executing said Applet, wherein said computer readable means for executing said Applet further comprises:
computer readable means for initiating a connection to Client Software, wherein said Client Software communicates with a Multi-User Shared State Server; and
computer readable means for terminating said connection to Client Software.

20. The program product of claim 19, further comprising:
computer readable means for sending an "addURL" notification over said connection to Client Software.

21. The program product of claim 19, further comprising:
computer readable means sending a "removeURL" notification over said connection to Client Software.

22. The program product of claim 19, further comprising:
computer readable means sending a "readData" request over said connection to Client Software.

23. The program product of claim 19, further comprising:
computer readable means sending a "writeData" request over said connection to Client Software.

24. The program product of claim 19, further comprising:
computer readable means for receiving a "changePage" notification over said connection to Client Software; and
computer readable means for initiating the retrieval of new data in accordance with said "changePage" notification.

25. The program product of claim 24, further comprising:
computer readable means for initiating a "follow" request for a target leader from said Client Software;
computer readable means for recording an identity of an originator of said "follow" request; and
computer readable means for initiating a "changePage" request to said originator as a result of actions taken by said target leader.

26. The program product of claim 19, wherein said computer readable means for initiating a connection to Client Software includes computer readable means for determining an identity of a "global" Applet, and wherein said connection to said Client Software is a logical connection established by forwarding requests to said "global" Applet.

27. The program product of claim 26, further comprising:
computer readable means for monitoring for a presence of a "global" Applet; and
computer readable means for becoming said "global" Applet should there be no said "global" Applet present.

* * * * *